United States Patent [19]

Martin et al.

[11] Patent Number: 5,078,175
[45] Date of Patent: Jan. 7, 1992

[54] VALVE

[75] Inventors: David B. Martin, Bradford; James A. Bradby, Liversedge; Andrew Nash, Greetland; Eric Gates, Clifton, all of United Kingdom

[73] Assignee: Kent Intral Limited, United Kingdom

[21] Appl. No.: 481,357

[22] Filed: Feb. 16, 1990

[30] Foreign Application Priority Data

Feb. 16, 1989 [GB] United Kingdom ............... 8903585

[51] Int. Cl.⁵ ..................... F16K 51/00; B08B 1/02
[52] U.S. Cl. ................... 137/242; 251/214; 277/24
[58] Field of Search ............ 137/242, 244; 251/214; 277/105, 123, 24, 218, 236; 15/104.16, 256.5

[56] References Cited

U.S. PATENT DOCUMENTS

| | | | |
|---|---|---|---|
| 2,625,413 | 1/1953 | Christensen | 277/105 |
| 3,352,316 | 11/1967 | Zahn | 137/242 |
| 3,917,223 | 11/1975 | Sidler | 137/242 |
| 4,054,156 | 10/1977 | Benson | 251/214 |
| 4,408,627 | 10/1983 | Harris | 251/214 |
| 4,773,440 | 9/1988 | Yanagawa et al. | 251/214 |
| 4,878,677 | 11/1989 | Larkins et al. | 277/105 |
| 4,886,241 | 12/1989 | Davis et al. | 277/105 |

Primary Examiner—George L. Walton
Attorney, Agent, or Firm—Pravel, Gambrell, Hewitt, Kimball & Krieger

[57] ABSTRACT

A valve comprises a first relatively fixed valve component assembly surrounding a second valve component assembly which is relatively movable within said first assembly. A seal is provided between the first and second valve component assemblies and a barrier assembly is provided for preventing particulate contaminant material reaching the seal. The barrier assembly comprises first and second barrier elements extending around said second valve component assembly. The first barrier element or elements are in engagement with the first valve component assembly and the second barrier element or elements are in engagement with the second valve component assembly. The barrier elements may be spring rings and form a labyrinth type seal between the two valve component assemblies.

10 Claims, 4 Drawing Sheets

VALVE

The present invention relates to a valve in which a seal is provided between two relatively movable components, e.g. between a valve stem or valve plug and a stationary valve body.

It is well known that valves may be employed for controlling fluid flow and/or effecting pressure reduction in oil or natural gas pipelines. Such valves incorporate seals between the valve stem or the valve plug and the valve body to prevent escape of gas or oil from the valve as well as ingress of unwanted contaminant material into the valve.

It is however found that the seals (particularly if they are of elastomeric material) may be damaged by contaminant material (e.g. grit or dirt) in the fluid flow stream or by material entering the valve from outside. Since such valves may be employed in comparatively inaccessible locations, replacement of failed seals may be difficult. Attempts to overcome this problem have involved the design of special seals which are not deleteriously affected by the contaminant material. However, such seals may be difficult and expensive to produce.

It is therefore an object of the present invention to obviate or mitigate the abovementioned disadvantages.

According to the present invention there is provided a valve comprising a first relatively fixed valve component assembly surrounding a second valve component assembly which is relatively moveable within said first assembly, a seal between said first and second valve component assemblies, said seal being located around the second valve component, and a barrier assembly for preventing particulate contaminant material reaching the seal, said barrier assembly comprising first and second barrier elements extending around said second valve component assembly, said first barrier element or elements being in engagement with the first valve component assembly and said second barrier elements being in engagement with the second valve component assembly.

Preferably the first barrier elements are sprung outwardly into engagement with the first valve component assembly and the second barrier elements are sprung inwardly into engagement with the second valve component assembly.

Preferably the barrier assembly comprises a plurality of each of said first and second barrier elements arranged to provide a labyrinth seal.

The seal may be an elastomeric seal and may include two limbs which are at an acute angle to each other and which are urged resiliently apart to provide the seal between the first and second components. Preferably also at least two such seals are provided between the components, with at least two of the seals having the apices between the limbs of the seals pointing towards each other.

The barrier assembly may be annular and be provided in an annular recess in the wall of either the first or second component, the walls of said recess serving to retain the assembly in position.

Irrespective of the cross-section of the first and second component assemblies of the valve, it is preferred that the surface of the movable component is hardened with respect to that of the stationary component in which the seals and barrier assembly may be housed. This differential hardening serves to resist wear on the first component and may be effected for example by surface treatment (e.g. nitriding) or by depositing hard material (e.g. titanium carbide) on the surface followed by smoothing.

The invention is applicable most particularly to a valve for controlling fluid flow and/or effecting pressure reduction in oil or natural gas pipelines as much protection as possible for the elastomeric seals may be provided between the valve stem and the valve body as well as between the valve plug and the valve body. At least one of each such seals may be protected by a respective barrier assembly. The barrier assembly removes particulate contaminant material and thus any fluid (oil or gas) which passes the barrier assembly will not carry with it any such material as would adversely affect the seal.

The invention will be further described by way of example only with reference to the accompanying drawings, in which.

Figures 1, 1A, 3:
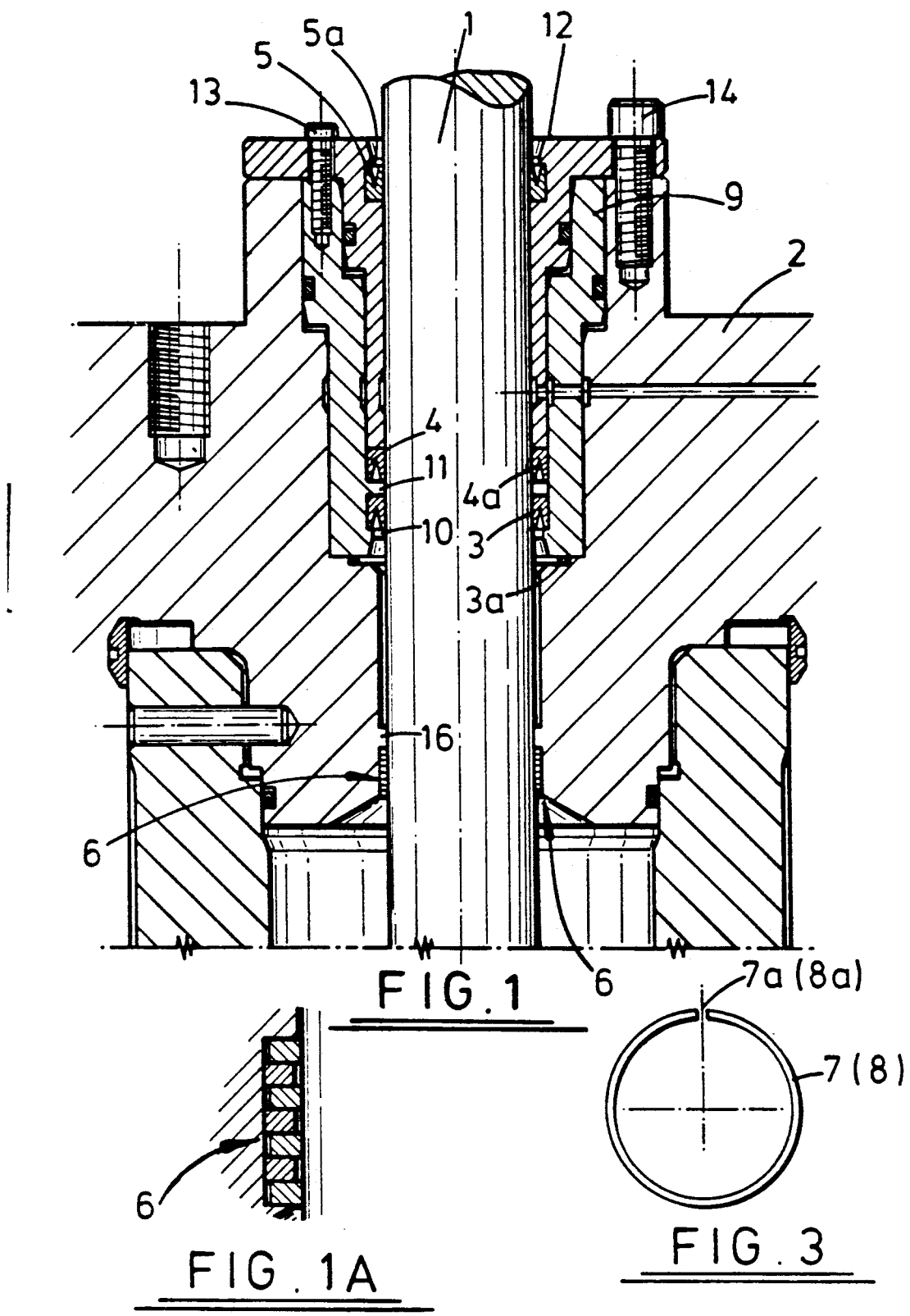
FIG. 1 is a cross-sectional view of a portion of a valve illustrating in particular the sealing of the valve stem.
FIG. 1A is an enlarged cross-sectional view of a portion of the valve of FIG. 1.
FIG. 3 is a plan view (not to scale) of a ring as used in the barrier assembly of FIG. 2.

Referring to FIG. 1, there is illustrated the top portion of a valve which incorporates a valve stem 1 sliding within a bonnet 2. Although full details of the valve are not illustrated in the drawing it may be of the type in which a valve plug (attached to the valve stem 1) is slidable on the inner face of an apertured cylindrical sleeve to open and close the apertures to control flow and/or effect pressure reduction. Such valves are used, for example, for effecting pressure reductions in natural gas.

As described more fully below, various seals are associated with the valve stem 1 to prevent leakage of fluids past the stem as well as ingress of unwanted material into the valve from outside the bonnet 2. These seals include three annular elastomeric seals 3, 4 and 5, and a pack 6 of metal rings 7 and 8 (see also FIG. 2).

The seals 3, 4 and 5 and the manner in which they are mounted in the valve will be described in more detail.

Each of seals 3, 4 and 5 has a body of elastomeric material formed with a general V-section annular groove 3a, 4a or 5a respectively. Although not illustrated in the drawings, each of the seals 3, 4 and 5 also incorporate a spring arrangement such that the limbs of the V-section are urged resiliently apart. The spring may for example be annular and extend fully around the V-section groove within the seal. The spring itself, may for example, be of V- or U-shaped or circular cross-section. Seals 3, 4 and 5 may be of the type available under the name VARISEAL.

The upper section of the bore of bonnet 2 is widened and stepped to receive an outer locating sleeve 9 which has two inwardly facing annular flanges 10 and 11, the distance between which corresponds to the height of seal 3. Locating within the outer sleeve 9 is an inner sleeve 12 which terminates above flange 11 by a distance corresponding to the depth of seal 4. The inner sleeve 12 is located in position by at least one bolt 13 which passes through the upper flange of the sleeve 12 into the bonnet 2. Sleeve 12 is located in position by at least one bolt 14 as shown. Sleeves 9 and 12 together provide a gland assembly for the valve.

It will be clear from FIG. 1 that the seal 3 is located between the flange 10 and 11, and that seal 4 is located between flange 11 and the bottom of inner sleeve 12. Each of these seals 3 and 4 is positioned so that its groove 3a or 4a is open towards the valve plug, i.e., the 'V' points upwardly as shown in FIG. 1.

Seal 5 is located as shown in a groove provided towards the upper end of the inner sleeve 12 such that its groove 5a is upwardly open.

Figure 2:
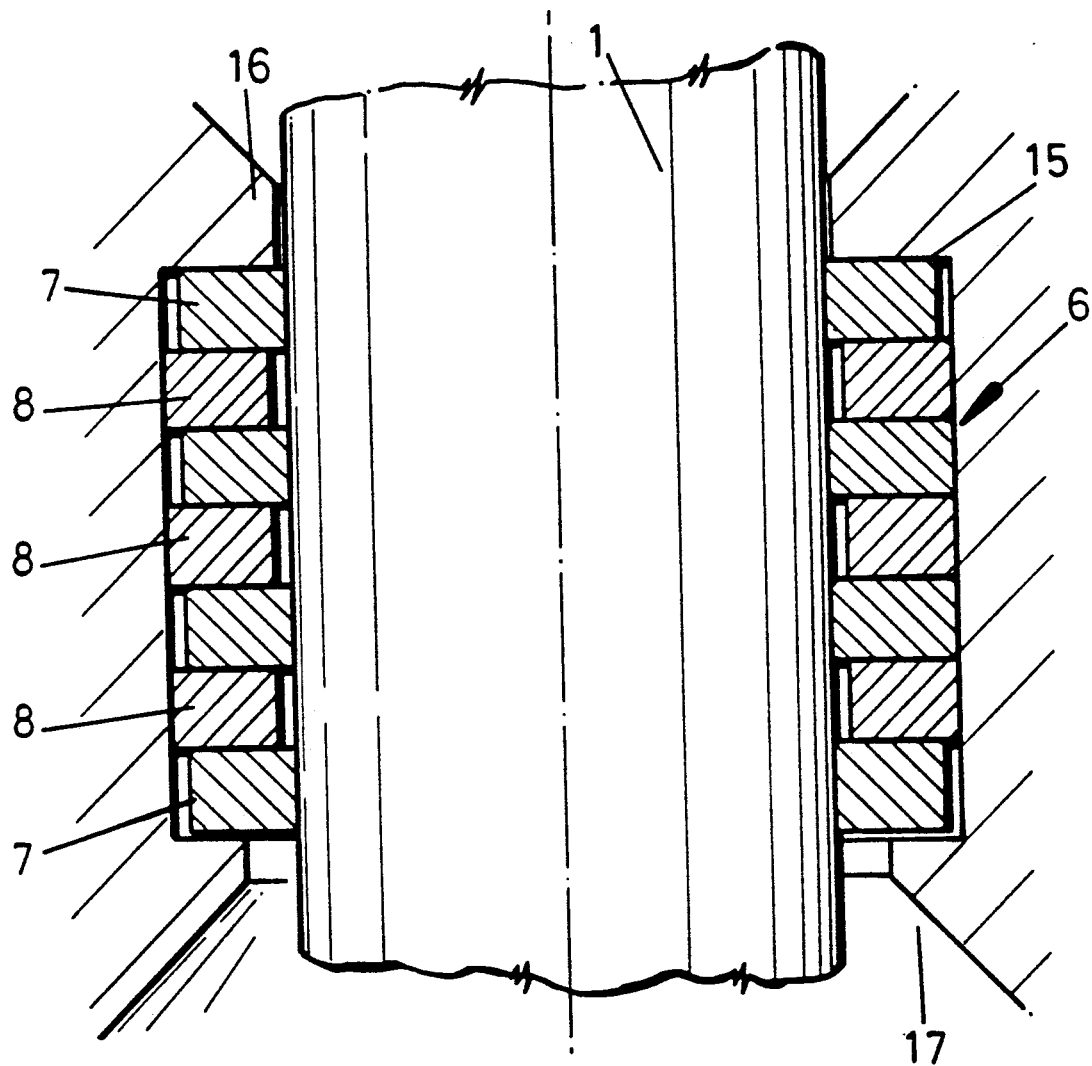
FIG. 2 is a detail, to an enlarged scale, of the barrier assembly in FIG. 1.

The pack 6 (of rings 7 and 8) is shown in more detail in FIG. 2. It will be seen that the pack is located in a groove 15 within the bonnet 2. One wall of groove 15 (the upper wall as shown in FIG. 2) is defined by an annular flange 16 on which the stem 1 is slidable. The other (lower) wall of groove 14 is of lesser depth than the flange 16 and there is a flared entry to groove 15, as depicted by reference numeral 17.

The rings 7 and 8 are juxtaposed within groove 14 in alternative generally face-to-face relationship. All rings 7 and 8 are metallic and of similar but not identical appearance in plan view. The plan view is shown in FIG. 3 and, as shown, each such ring 7 or 8 is a split ring with a small gap 7a (or 8a) in its circumference. The difference between rings 7 and 8 is that the former are dimensioned and constructed so as to spring inwardly into engagement with the valve stem 1 whereas the latter are dimensioned and constructed so as to spring outwardly into engagement with the groove 14.

Furthermore, the rings 7 are formed so that their radially inner peripheral edges are formed as a sharp edge for the purpose of 'scraping' unwanted matter (e.g., oil, dirt etc) from the stem 1. It will thus be appreciated that the pack or rings 7 and 8 provides a labyrinth seal. Accumulated matter is collected within the spaces between rings 8 and the stem 1.

The pack of rings 7 and 8 thus serve to protect the more vulnerable elastomeric seals 3 and 4 from contamination which could deteriously effect their performance.

Additionally, the positioning of the seals 3 and 4 with their grooves 3a and 4a opening toward the valve plug (i.e., the 'high' pressure side of the bonnet) ensures that the limbs of these seals are urged apart by the pressure to enhance the sealing effect.

It will be appreciated that all the seals described (i.e. seals 3-5 and pack 6) are housed within their own grooves thus avoiding the risk of damage from the other components/seals, during service. Additonally no circlips or separate retaining devices are required to hold the seals in position. To resist wear, the surface of stem 1 may be differentially hardened with respect to the surfaces of bonnet 2 (which houses the pack 6) and the sleeve 12 (which houses seals 3-5).

It will also be appreciated that the gland assembly provided by the inner and outer sleeves 9 and 12 is simple to dismantle and can be removed from the top of the valve without risk of damage to the stem or bonnet.

Figure 4:
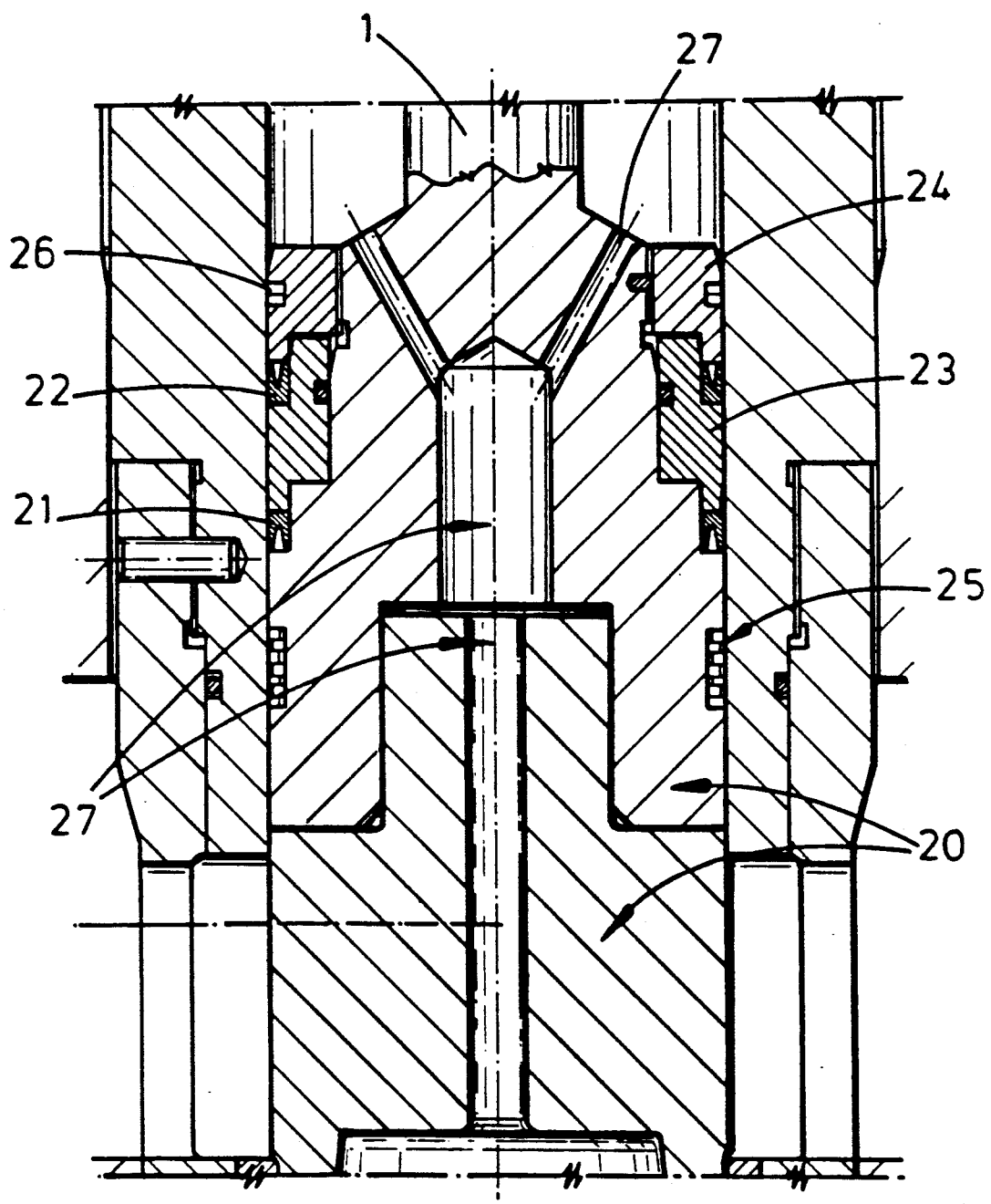
FIG. 4 is a cross-sectional view of a portion of a valve illustrating in particular the sealing of the valve plug.

FIG. 4 shows a valve plug assembly 20 which is shown as being attached to a valve stem 1 like the valve stem illustrated in FIG. 1).

Two V-shaped elastomeric seals 21 and 22 (similar to the seals 3-5) are provided and, as illustrated, are located in position by insert pieces 23 and 24. The groove of seal 21 opens downwardly whereas that of seal 22 opens upwardly.

Provided below the seal 21 is a pack 25 of scraper rings (similar to pack 6) and a similar pack 26 is provided above seal 22.

Two packs 25 and 26 of rings are provided because the plug 20 incorporates a balancing tube arrangement 27 whereby the pressure on both sides of the plug may be equalized, but this of course has the disadvantage that contaminant material (e.g., oil or dirt) may be passed along the tube arrangement 27 so that both of the seals 21 and 22 require protection.

As previously, the surface on which seals 21 and 22 and the rings 25 slide may be differentially hardened.

Figure 5:
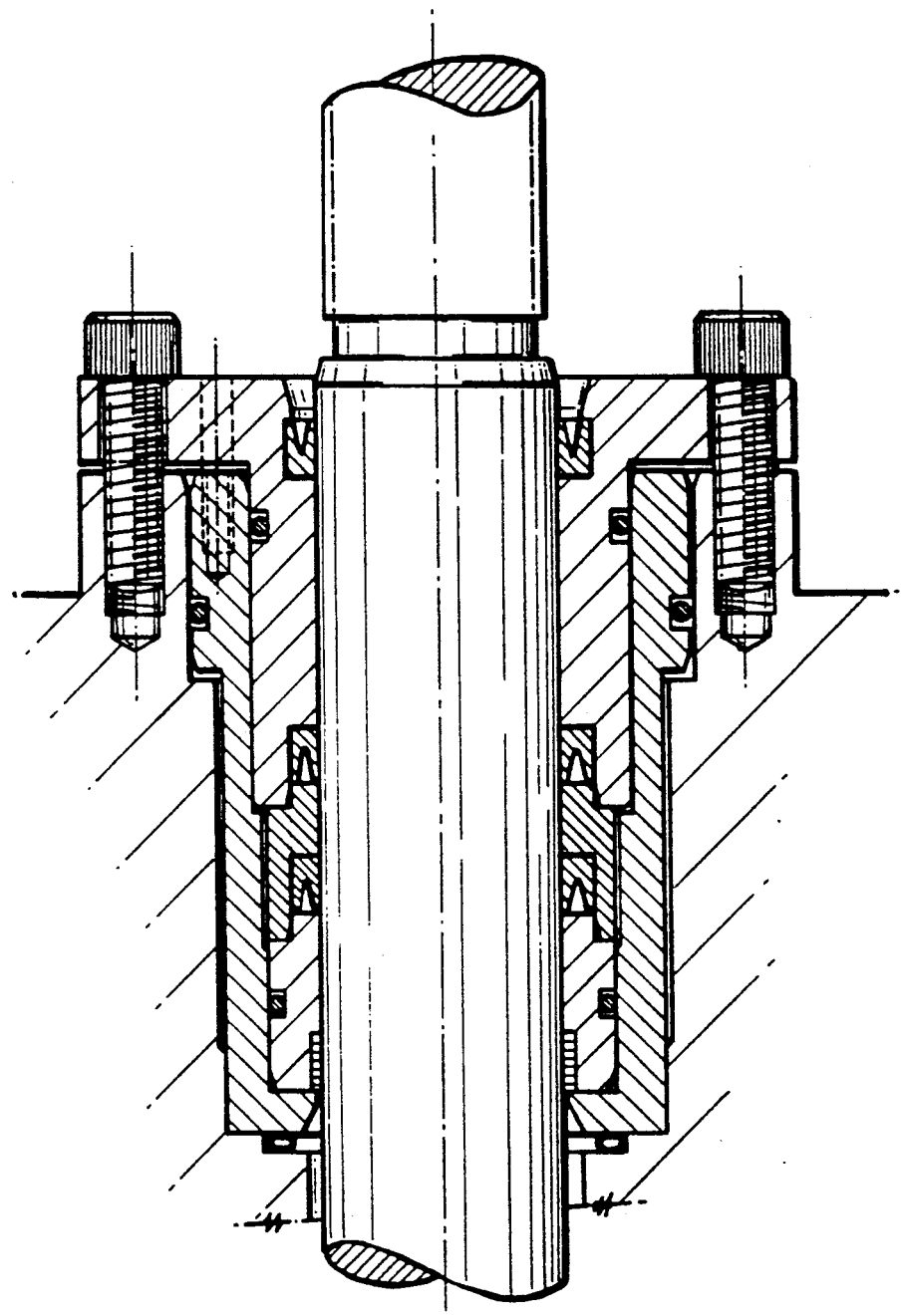
FIG. 5 illustrates a gland housing assembly in accordance with a further embodiment of the invention.

FIG. 5 of the accompanying drawings shows a cross-sectional view of a gland housing assembly in which the barrier assembly is formed as part of a cartridge for easy removal and replacement.

Although the invention has been described with specific reference to the sealing of valve stems and plugs, it should be appreciated that it can be applied to other devices where sealing is required. Furthermore, the invention may be to other types of motion from the specifically described (i.e. linear motion), e.g. rotary or spiral motion.

We claim:

1. A valve comprising a first relatively fixed valve component assembly surrounding a second valve component assembly which is relatively moveable within said first valve component assembly, a seal assembly disposed between said first and second valve component assemblies, said seal assembly being located around said second valve component assembly, and a barrier assembly for preventing particulate contaminant material reaching said seal assembly, said barrier assembly comprising a stacked plurality of alternating first and second metallic spring barrier elements extending around said second valve component assembly, said first barrier elements being resiliently sprung outwardly into engagement with said first valve component assembly to form a plurality of collection spaces between said alternating barrier elements for collecting particulate contaminant material therein and said second barrier elements being resiliently sprung inwardly into engagement with said second valve component assembly for scraping any particulate contaminant material off of said second valve component assembly and into said collection spaces to prevent particulate contaminant material form reaching said seal assembly.

2. A valve as claimed in claim 1 comprising a plurality of each of said first and second barrier elements arranged to provide a labyrinth type seal.

3. A valve as claimed in claim 1 wherein said barrier assembly is annular and said first and second barrier elements are, respectively, first and second spring rings, said first ring or rings springing outwardly to engage said first valve component assembly and said second ring or rings springing inwardly to engage said second valve component assembly.

4. A valve as claimed in claim 3 wherein said second rings have at least one sharp radially inner peripheral edge for providing a scraping edge.

5. A valve as claimed in claim 3 wherein said barrier assembly is provided in an annular recess in the said first valve component assembly.

6. A valve as claimed in claim 1 wherein said seal comprises elastomeric material.

7. A valve as claimed in claim 6 wherein said seal includes two limbs which are at an acute angle to each other and which are resiliently urged apart to provide a seal between said first and second valve component assemblies.

8. A valve as claimed in claim 1 wherein said barrier elements are metallic.

9. A valve as claimed in claim 1 wherein said first component assembly of the valve is a gland assembly said second, moveable component is a valve stem.

10. A valve as claimed in claim 1 wherein said first valve component assembly is a valve body, and the second valve component assembly is a valve plug.

* * * * *